United States Patent
Wang

(10) Patent No.: US 8,141,857 B2
(45) Date of Patent: Mar. 27, 2012

(54) CLAMPING DEVICE FOR WORKPIECES WITH DIFFERENT SIZES

(75) Inventor: Chun-Kai Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 451 days.

(21) Appl. No.: 12/468,842

(22) Filed: May 19, 2009

(65) Prior Publication Data

US 2009/0309282 A1 Dec. 17, 2009

(30) Foreign Application Priority Data

Jun. 12, 2008 (CN) .......................... 2008 1 0302110

(51) Int. Cl.
  *B25B 5/08* (2006.01)
  *B25B 1/02* (2006.01)
(52) U.S. Cl. .................. 269/87.2; 269/107; 269/153
(58) Field of Classification Search ................ 269/87.2, 269/104, 107, 108, 153, 218, 229, 20, 21; 81/128, 129, 170, 172
See application file for complete search history.

(56) References Cited

U.S. PATENT DOCUMENTS

| 167,127 | A | * | 8/1875 | Thomas | 269/203 |
| 3,156,480 | A | * | 11/1964 | Wuesthoff | 279/119 |
| 6,073,522 | A | * | 6/2000 | Carnesi | 81/128 |
| 6,971,284 | B2 | * | 12/2005 | Owoc | 81/58.2 |

FOREIGN PATENT DOCUMENTS

CN 2730560 Y 10/2005

* cited by examiner

*Primary Examiner* — David B Thomas
(74) *Attorney, Agent, or Firm* — Altis Law Group, Inc.

(57) ABSTRACT

A clamping device for clamping a workpiece includes a support member, sliding members and a rotating member. The support member is configured for supporting the workpiece. The support member defines cutouts in a periphery thereof. The sliding members each is positioned in one of the cutouts. Each of the sliding members has a cam pin. The rotating member is rotatable relative to the support member. The rotating member defines cam slots on top thereof. The cam pins are received in the cam slots and slidable in the cam slots. Positions of the sliding members are changeable along radial directions of the support member when the rotating member is rotated.

20 Claims, 6 Drawing Sheets

CLAMPING DEVICE FOR WORKPIECES WITH DIFFERENT SIZES

BACKGROUND

1. Technical Field

The present invention relates to clamping devices, and particularly to a clamping device for clamping workpieces such as flat panels.

2. Description of Related Art

When machining a workpiece, such as a flat panel, the flat panel should be fastened on a support member of a clamping device. Flat panels with different sizes typically require different support members. This may increase costs and reduce the efficiency of machining the flat panels.

What is needed, therefore, is a clamping device that can overcome the above shortcomings.

BRIEF DESCRIPTION OF THE DRAWINGS

Many aspects of the present clamping device can be better understood with reference to the following drawings. The components in the drawings are not necessarily drawn to scale, the emphasis instead being placed upon clearly illustrating the principles of the present clamping device. Moreover, in the drawings, like reference numerals designate corresponding parts throughout the several views.

DETAILED DESCRIPTION OF EMBODIMENTS

Reference will now be made to the drawings to describe various embodiments of the present clamping device.

Figure 1:
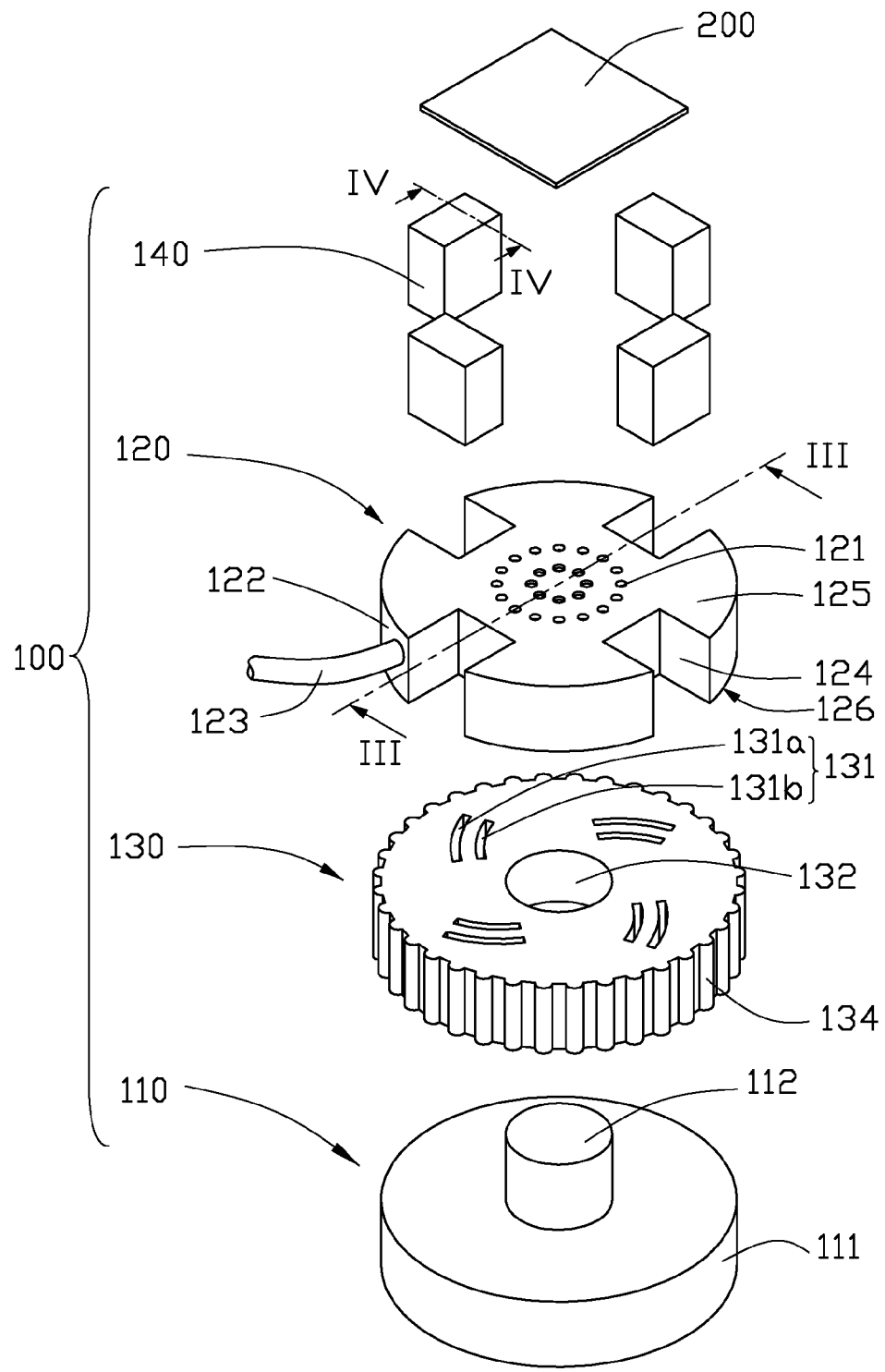
FIG. 1 is an exploded isometric view of a clamping device in accordance with an exemplary embodiment, together with a workpiece, the clamping device including a support member and four sliding members.
Figure 2:
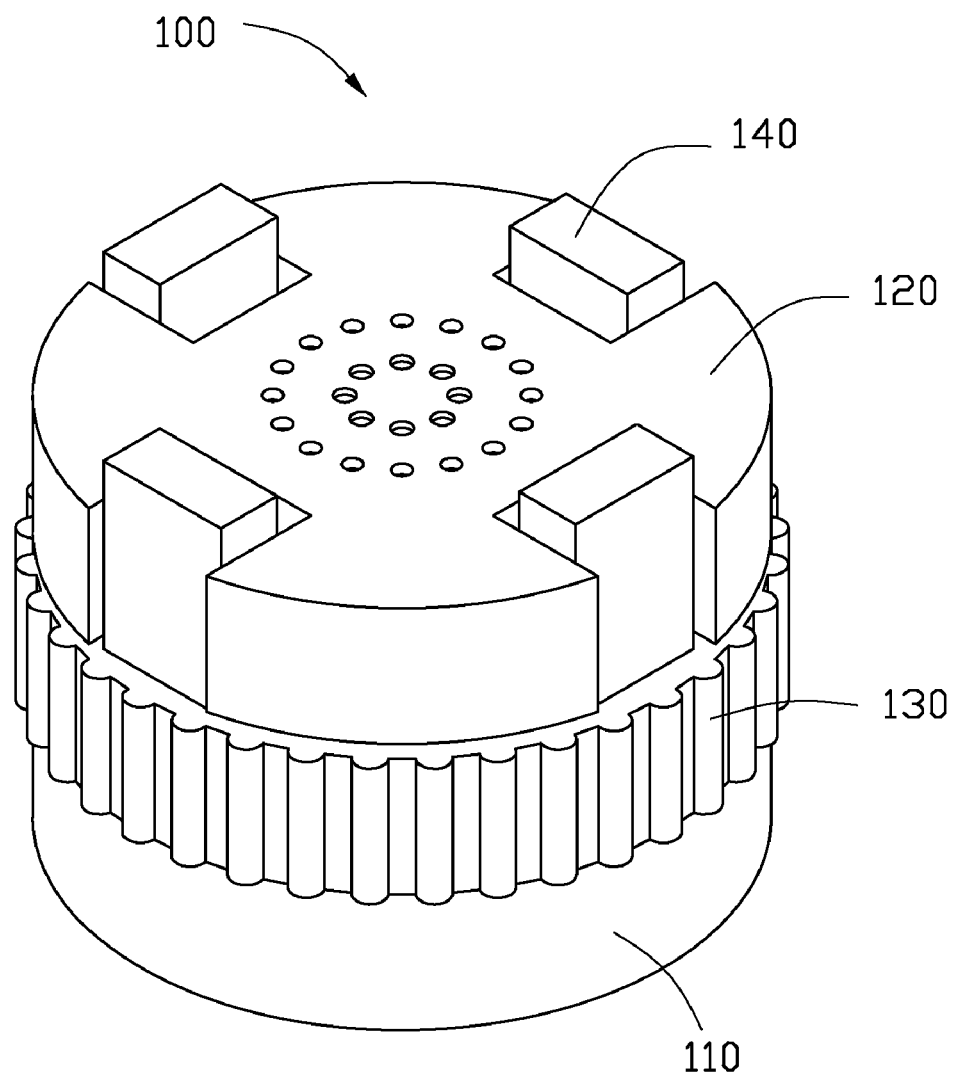
FIG. 2 is an assembled view of the clamping device of FIG. 1.

Referring to FIGS. 1 and 2, a clamping device 100 in accordance with an exemplary embodiment is shown. The clamping device 100 is for clamping a workpiece 200. The clamping device 100 includes a base 110, a support member 120, a rotating member 130, and four sliding members 140.

The base 110 includes a main body 111, and a pivot 112 integrally formed on top of the main body 111. In this embodiment, the main body 111 and the pivot 112 are coaxial with each other. A radius of the main body 111 is greater than a radius of the pivot 112. In the illustrated embodiment, each of the main body 111 and the pivot 112 is in the form of a short cylinder.

The rotating member 130 has a generally cylindrical shape, and defines a through hole 132 in the center thereof. In this embodiment, the through hole 132 has a cylindrical shape and is coaxial with a central axis of the rotating member 130. A thickness of the rotating member 130 along a direction of the central axis thereof is substantially equal to or less than an axial length of the pivot 112. A radius of the through hole 132 is substantially equal to or slightly greater than a radius of the pivot 112. The pivot 112 is inserted through the through hole 132, and the rotating member 130 is rotatable about the pivot 112 and supported by the main body 111. That is, the pivot 112 functions as a pintle.

Figure 3:
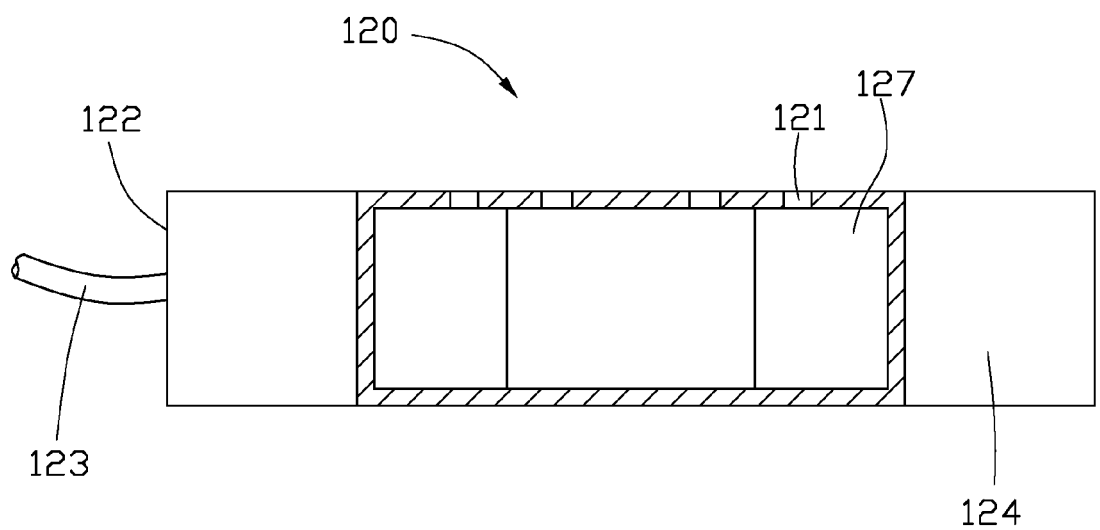
FIG. 3 is a cross-sectional view of the support member taken along line III-III of FIG. 1.

Referring also to FIG. 3, the support member 120 has a hermetically sealed hollow structure; thus a cavity 127 is defined in the support member 120. In this embodiment, the support member 120 has a generally cylindrical shape. The support member 120 has a first surface 125 and a second surface 126 at opposite top and bottom walls thereof. The first surface 125 defines a plurality of holes 121 therein. The holes 121 are through holes, which span through the top wall of the support member 120 and are in communication with the cavity 127. In this embodiment, the plurality of holes 121 is arranged in two imaginary circles, which are concentric. The support member 120 has a side surface 122. A pipe 123 perforates through the side surface 122. The pipe 123 has two opposite openings (not shown). One of the openings of the pipe 123 is in communication with the cavity 127, and the other opening is in communication with a vacuum generator (not shown) for pumping air or gas out from the cavity 127. The first surface 125 is configured for supporting the workpiece 200.

When the air or gaseous pressure in the cavity 127 is reduced to less than atmospheric pressure via the vacuum generator, the workpiece 200 is driven by the negative pressure in the cavity 127 to be held on the first surface 125 via the holes 121. The support member 120 may be fixed to a top (distal) end of the pivot 112, such as by way of adhering or riveting. The support member 120 may contact or be spaced from the rotating member 130.

The support member 120 defines four cutouts 124 in a peripheral portion thereof, with the cutouts 124 angularly equidistantly spaced from each other. Each of the cutouts 124 is bounded by walls that are oriented parallel to a central axis of the support member 120.

Figure 4:
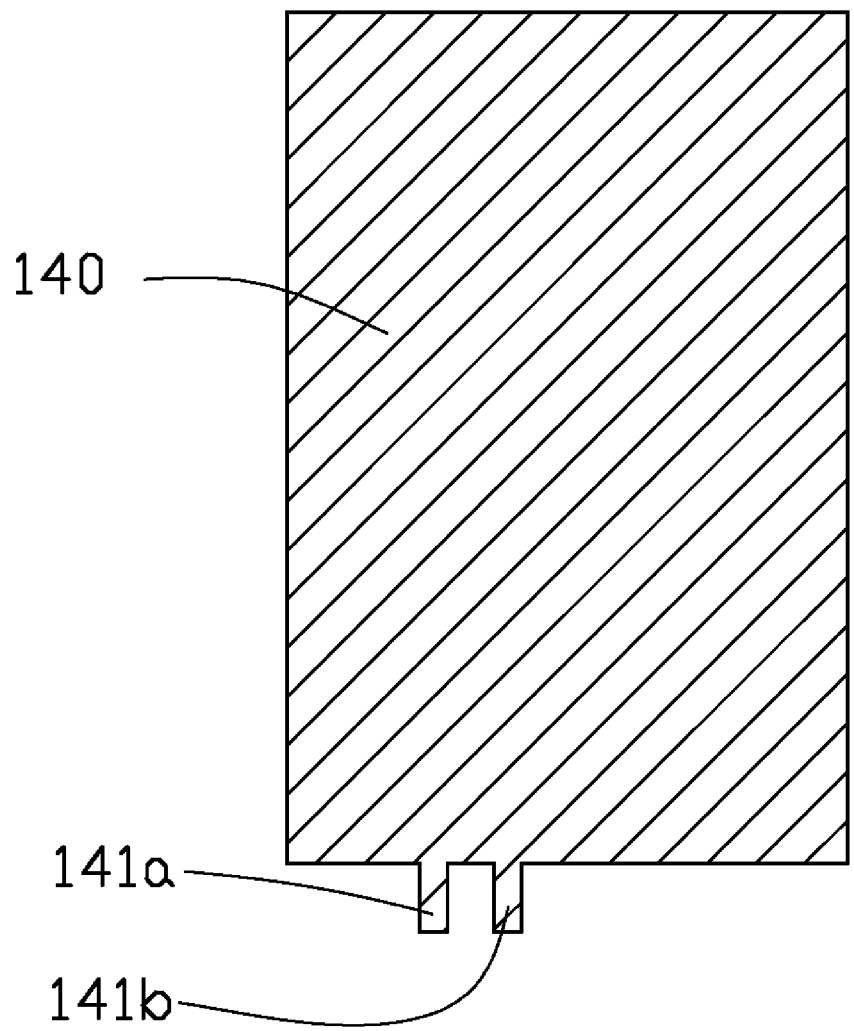
FIG. 4 is a cross-sectional view of one of the sliding members taken along line IV-IV of FIG. 1.

Referring also to FIG. 4, the four sliding members 140 are positioned in the respective cutouts 124. In this embodiment, each of the sliding members 140 may have a generally cuboid (parallelepiped) shape. Each of the sliding members 140 has two cam pins 141a and 141b protruding from a bottom surface thereof. The rotating member 130 defines four cam slot groups 131 surrounding the through hole 132. Each cam slot group 131 includes two cam slots 131a and 131b corresponding to the two cam pins 141a and 141b of a respective sliding member 140. The cam slots 131a and 131b are curved, as viewed from a top of the rotating member 130, but are not limited to this shape. The cam slot 131a extends along a direction generally obliquely away from the central axis of the rotating member 130, and is generally inclined relative to any radial direction of the rotating member 130 which it intersects. In this embodiment, the cam slot 131b is similar to and parallel to the cam slot 131a. The cam slot 131b is located inward of the cam slot 131a, and is slightly shorter than the cam slot 131a. The cam pin 141a of one sliding member 140 is inserted into the cam slot 131a, and the cam pin 141b of the sliding member 140 is inserted into the cam slot 131b. In an alternative embodiment, the cam slots 131a and 131b can be straight.

When the rotating member 130 rotates relative to the sliding member 140, the sliding member 140 is driven to move along a radial direction of the support member 120 by the rotating member 130, by virtue of the camming relationship of cam pins 141a, 141b in the cam slots 131a, 131b. A knurl structure 134 is formed on a circumferential (peripheral) side surface of the rotating member 130, for easy rotating of the rotating member 130 by a human user or by a machine. In this embodiment, the knurl structure 134 includes a plurality of knurls each oriented parallel to the central axis of the rotating member 130. The knurls are uniformly arranged around the circumferential side surface of the rotating member 130.

In various alternative embodiments, the shape of each sliding member 140 can for example be cylindrical. Each sliding member 140 can have only one cam pin, or more than two cam pins. There can be two, three or more than four sliding members 140 in one clamping device 100.

Figure 5:
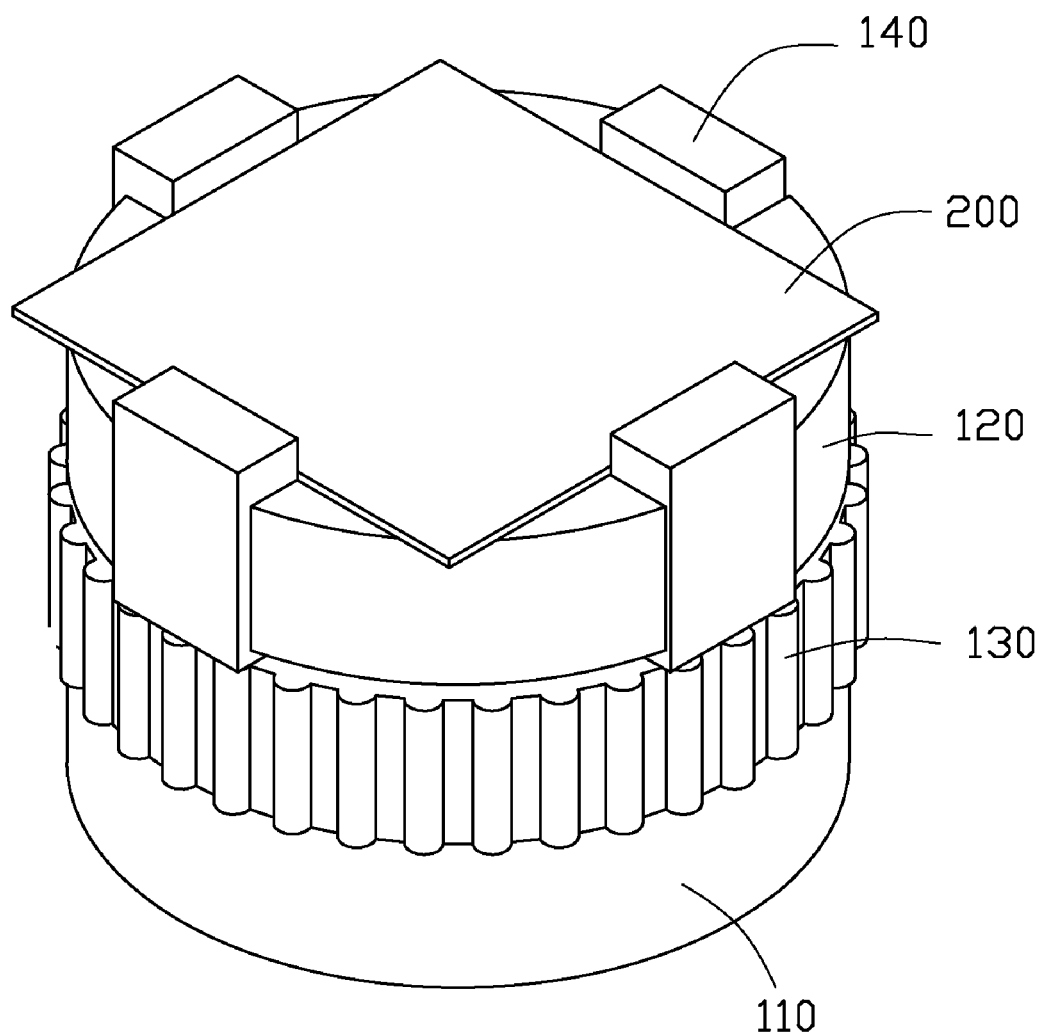
FIG. 5 is similar to FIG. 2, but showing the workpiece of FIG. 1 clamped by the clamping device.
Figure 6:
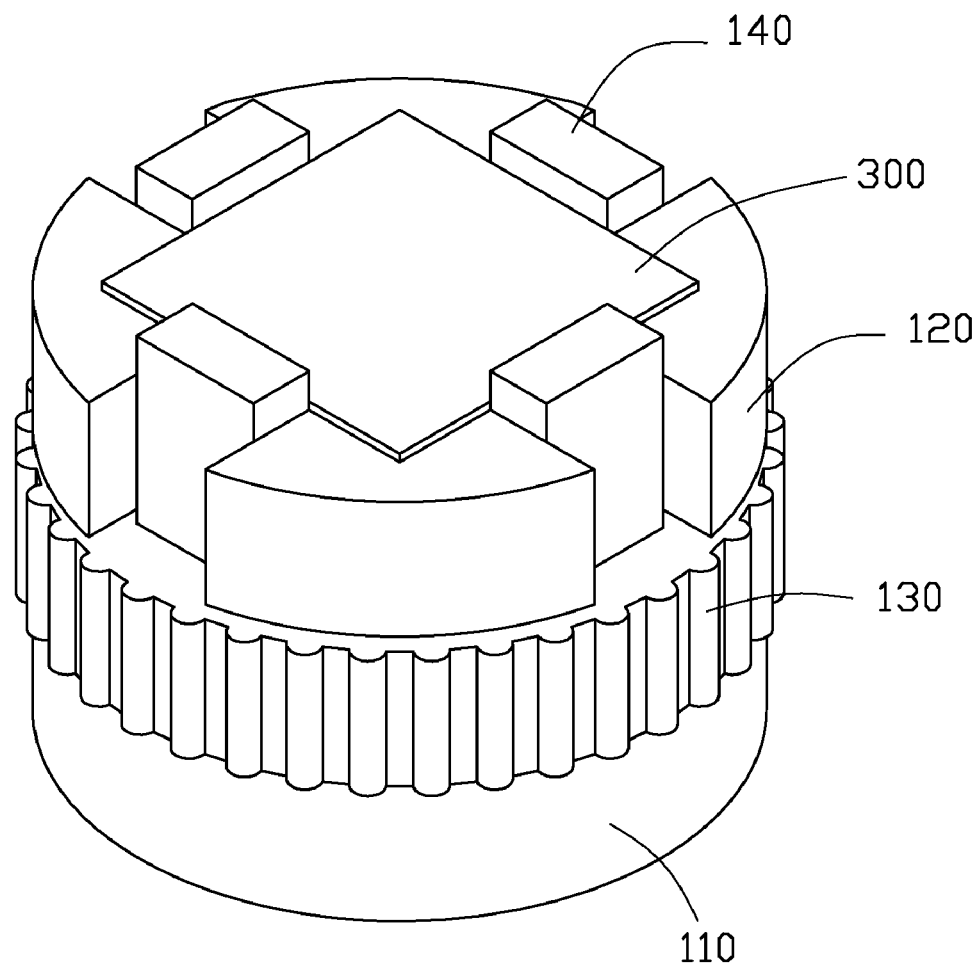
FIG. 6 is similar to FIG. 5, but showing a smaller sized workpiece clamped by the clamping device.

Referring to FIG. 5, this shows the clamping device being used to clamp the workpiece 200, which is a relative large one. In an exemplary embodiment, the workpiece 200 can be a rectangular flat panel. Firstly, the rotating member 130 is rotated in a counterclockwise direction relative to the support member 120. The sliding members 140 are thereby driven to move away from the central axis of the support member 120 along radial directions of the support member 120. The workpiece 200 is placed on the first surface 125 of the support member 120. Then, the rotating member 130 is rotated in a clockwise direction relative to the support member 120 to drive the sliding members 140 to move toward the central axis of the support member 120 along radial directions of the support member 120 until the sliding members 140 abut four edges of the workpiece 200. In one example, the sliding members 140 may tightly press the edges of the workpiece 200. Then the cavity 126 in the support member 120 is pumped to an air or gaseous pressure less than atmospheric pressure via the vacuum generator, so that the workpiece 200 is pulled tighter onto the support member 120. Thus, the workpiece 200 is clamped by the clamping device 100. Referring to FIG. 6, a workpiece 300 with a smaller size is clamped by the clamping device 100 in the same way as described above.

The clamping device 100 can clamp workpieces with different sizes, thus decreasing costs and increasing the efficiency of machining of such workpieces.

It is to be understood that the above-described embodiments are intended to illustrate rather than limit the invention. Variations may be made to the embodiments without departing from the spirit of the invention as claimed. The above-described embodiments are intended to illustrate the scope of the invention and not restrict the scope of the invention.

What is claimed is:

1. A clamping device for clamping a workpiece, the clamping device comprising:
a support member configured for supporting the workpiece, the support member defining a plurality of cutouts in a periphery thereof and a cavity therein, the support member having a top wall and a bottom wall at opposite sides, a plurality of through holes spanning through the top wall of the support member and being in communication with the cavity;
a plurality of sliding members each positioned in one of the plurality of cutouts, each of the plurality of sliding members having at least one cam pin; and
a rotating member rotatable relative to the support member, the rotating member defining a plurality of cam slots, the cam pins received in the cam slots and slidable in the cam slots, wherein positions of the sliding members are changeable along radial directions of the support member when the rotating member is rotated.

2. The clamping device of claim 1, further comprising a pipe engaged with a peripheral side wall of the support member and being in communication with the cavity, wherein the top wall is configured for supporting the workpiece, and a gas flow suction path is defined from the through holes to the cavity to the pipe.

3. The clamping device of claim 1, wherein the rotating member has a cylindrical shape, a plurality of knurls being formed on a circumferential side surface of the rotating member for facilitating rotating of the rotating member.

4. The clamping device of claim 3, wherein each of the knurls is oriented parallel to a central axis of the rotating member.

5. The clamping device of claim 3, further comprising a base, the base comprising a main body and a pivot above the main body, the rotating member defining an axial through hole in a center thereof, the pivot being received through the through hole, with the rotating member being rotatable about the pivot.

6. The clamping device of claim 5, wherein each of the main body and the pivot has a cylindrical shape, and a radius of the main body is greater than a radius of the pivot.

7. The clamping device of claim 6, wherein a shape of each sliding member is generally cuboid.

8. The clamping device of claim 7, wherein the at least one cam pin comprises at least two cam pins, each of the cam pins being received in the respective cam slot.

9. The clamping device of claim 1, wherein each cam slot extends along a direction obliquely away from a central axis of the rotating member and is inclined relative to any radial direction of the rotating member which it intersects.

10. The clamping device of claim 9, wherein each cam slot is curved, as viewed along a direction parallel to the central axis of the rotating member.

11. A clamping device for clamping a workpiece, the clamping device comprising:
a support member configured for supporting the workpiece, the support member defining a plurality of cutouts in a periphery thereof;
a plurality of sliding members each movably positioned in one of the plurality of cutouts, each of the plurality of sliding members having at least one cam pin;
a rotating member rotatable relative to the support member, the rotating member defining an axial through hole in a center thereof and a plurality of cam slots surrounding the through hole, the sliding members being positioned on top of the rotating member with the cam pins slidably received in the cam slots, the rotating member being capable of driving the cam pins radially outwardly on a condition that the rotating member is rotated in a first direction, and being capable of driving the cam pins radially inwardly on a condition that the rotating member is rotated in a second direction that is opposite to the first direction; and
a base comprising a main body and a pivot above the main body, the pivot being received through the through hole, with the rotating member being rotatable about the pivot.

12. The clamping device of claim 11, wherein each cam slot extends along a direction obliquely away from a central axis of the rotating member and is inclined relative to any radial direction of the rotating member which it intersects.

13. The clamping device of claim 11, wherein the support member has a top wall and a bottom wall at opposite sides, and defines a cavity therein, a plurality of through holes spanning through the top wall of the support member and being in communication with the cavity.

14. The clamping device of claim 13, further comprising a pipe engaged with a peripheral side wall of the support member and being in communication with the cavity, wherein the top wall is configured for supporting the workpiece, and a gas flow suction path is defined from the through holes to the cavity to the pipe.

15. The clamping device of claim 11, wherein the rotating member has a cylindrical shape, a plurality of knurls being formed on a circumferential side surface of the rotating member for facilitating rotating of the rotating member.

16. The clamping device of claim 15, wherein each of the knurls is oriented parallel to a central axis of the rotating member.

17. The clamping device of claim 11, wherein each of the main body and the pivot has a cylindrical shape, and a radius of the main body is greater than a radius of the pivot.

18. A clamping device for clamping a workpiece, the clamping device comprising:
  a support member configured for supporting the workpiece, the support member defining a plurality of cutouts in a periphery thereof;
  a plurality of sliding members each positioned in one of the plurality of cutouts, each of the plurality of sliding members having at least one cam pin;
  a rotating member rotatable relative to the support member, the rotating member defining an axial through hole in a center thereof and a plurality of cam slots surrounding the through hole, the cam pins received in the cam slots and slidable in the cam slots, wherein positions of the sliding members are changeable along radial directions of the support member when the rotating member is rotated; and
  a base comprising a main body and a pivot above the main body, the pivot being received through the through hole, with the rotating member being rotatable about the pivot.

19. The clamping device of claim 18, wherein the rotating member has a cylindrical shape, a plurality of knurls being formed on a circumferential side surface of the rotating member for facilitating rotating of the rotating member.

20. The clamping device of claim 18, wherein each of the main body and the pivot has a cylindrical shape, and a radius of the main body is greater than a radius of the pivot.

* * * * *